Dec. 25, 1928.

W. J. SMITH 1,696,869

RAILWAY BRAKE

Filed Nov. 29, 1924    4 Sheets-Sheet 1

INVENTOR
William J. Smith
BY
Mayer, Warfield and Watson
ATTORNEY

Dec. 25, 1928.   1,696,869

W. J. SMITH

RAILWAY BRAKE

Filed Nov. 29, 1924   4 Sheets-Sheet 4

INVENTOR
William J. Smith
BY
Mayer, Warfield and Watson
ATTORNEY

Patented Dec. 25, 1928.

1,696,869

UNITED STATES PATENT OFFICE.

WILLIAM JUDSON SMITH, OF ST. PAUL, MINNESOTA, ASSIGNOR OF ONE-THIRD TO HORACE LOWRY, OF MINNEAPOLIS, MINNESOTA, AND ONE-THIRD TO ALPHONSUS L. DRUM, OF CHICAGO, ILLINOIS.

RAILWAY BRAKE.

Application filed November 29, 1924. Serial No. 752,857.

This invention relates to railway car trucks and more particularly to the construction for supporting the car and the brake rigging.

The invention has for its object generally to provide an improved construction and arrangement of parts which is efficient, economical and readily manufactured.

A more specific object of this invention is to provide an improved arrangement of brake actuating mechanism which insures the even application of braking power to the brake drums under substantially all conditions of service.

Other objects of the invention will in part be obvious and will in part appear hereinafter.

The invention accordingly comprises the features of construction, combinations of elements, and arrangement of parts, which will be exemplified in the construction hereinafter set forth and the scope of the application of which will be indicated in the claims.

For a fuller understanding of the nature and objects of the invention, reference should be had to the following detailed description taken in connection with the accompanying drawing, in which.

Figure 1:
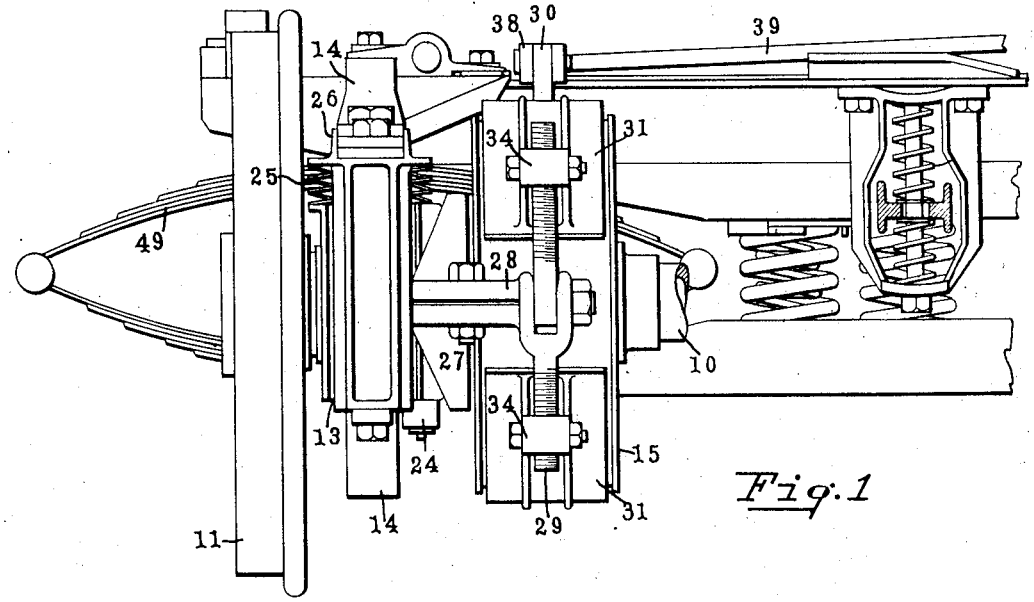
Figure 1 is a fragmentary view mainly in elevation showing the end of a railway car truck constructed in accordance with this invention.
Figure 2:
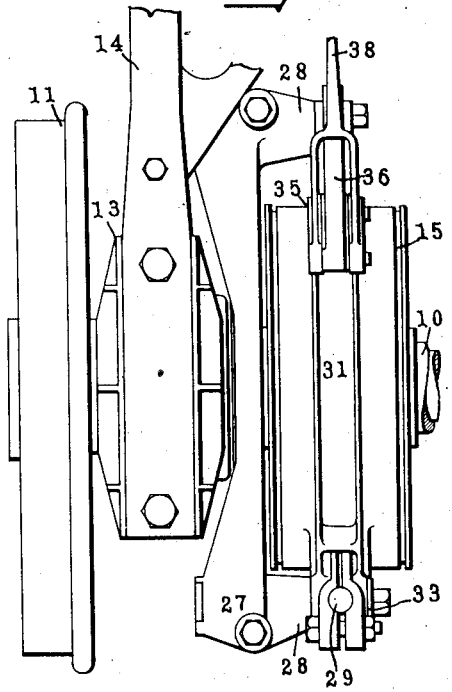
Fig. 2 is a fragmentary plan view of the construction shown in Fig. 1.

Referring now to the drawings, 10 denotes an axle having car wheels 11 rigidly secured to its extremities. Each truck, as shown, has a pair of axles which are journaled in bearings 12 disposed "inside" or between the wheels 11 and carried by journal housings 13, the latter being secured in the truck frame 14 so as to carry the axles in transverse relation thereto. Secured on the axle 10, preferably inside the journal housing 13, is a brake drum 15. As shown in Figs. 1, 2, 4 and 5 there preferably is but one brake drum on an axle, the brake drum being disposed adjacent the left-hand journal housing.

Figure 3:
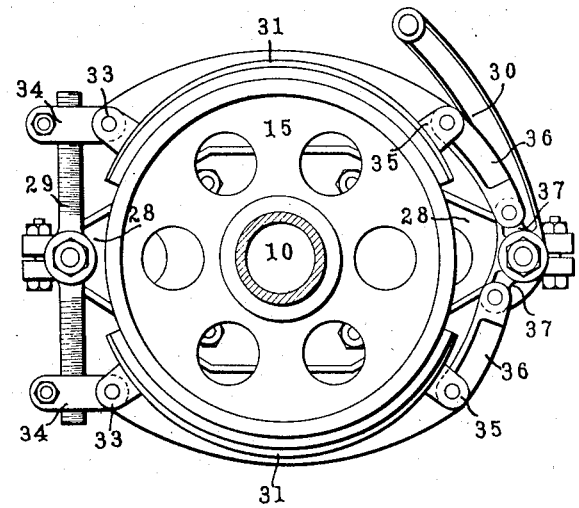
Fig. 3 is an elevation showing in particular the details of the braking mechanism shown in Figs. 1 and 2.
Figure 4:
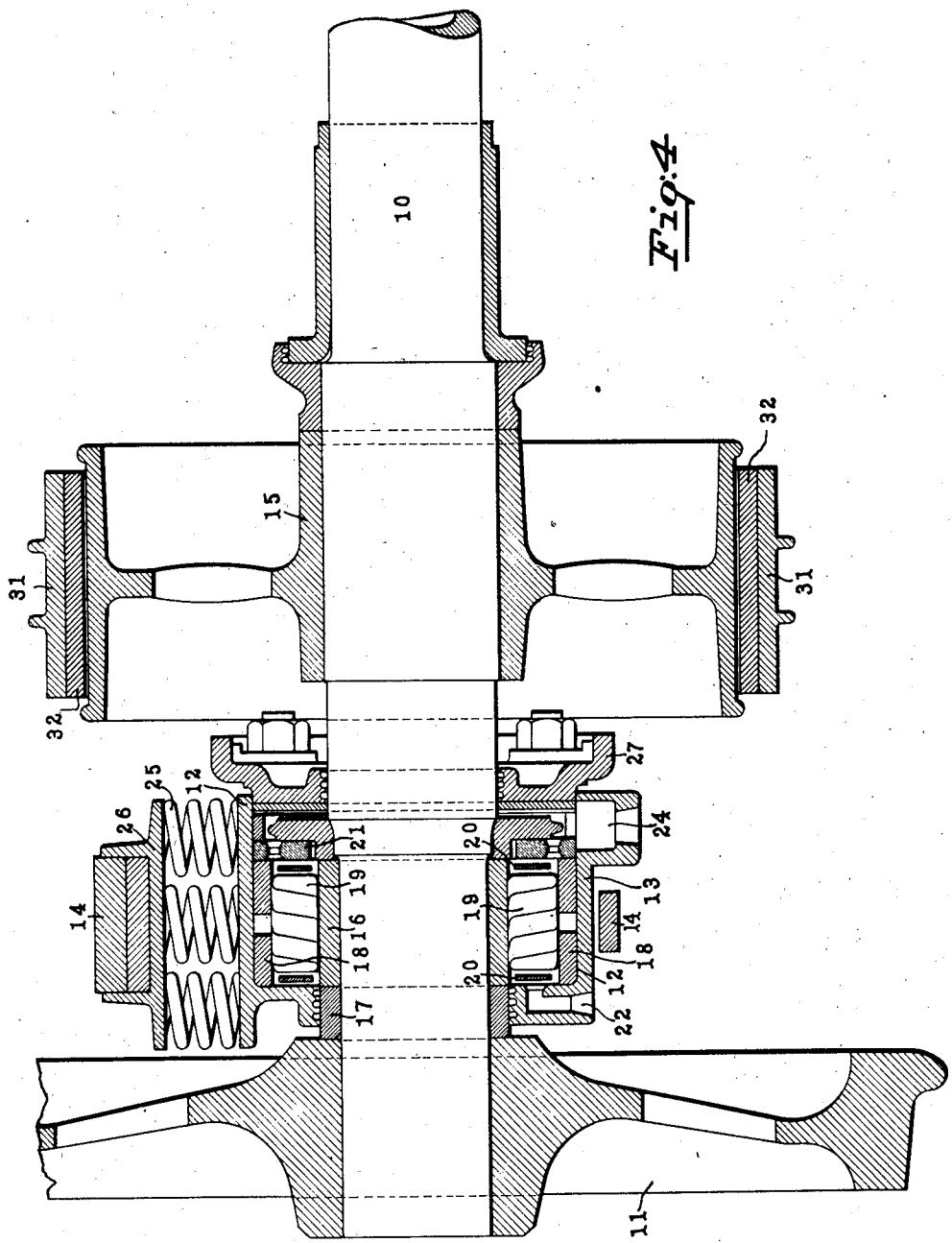
Fig. 4 is an enlarged vertical section of the improved construction for journaling the car wheels in the truck employed in this invention.

As shown in Fig. 4 the bearings here provided are of the roller type, and comprise an inner bearing sleeve 16, which is disposed directly on the axle 10 and spaced from the wheel 11 by the distance sleeve 17, and outer bearing rings 18, and a plurality of resilient rollers 19 which are interposed between sleeve 16 and rings 18 and held in alignment by means of the ring frames shown at 20. Additional spacing means 21 are inserted at the right of the bearing proper to close the journal housing and assist in retaining the lubricant which is preferably introduced through the passage shown on the left at 22 and permitted to work out into the well or enlargement shown at the bottom of the journal housing on the right hand side at 24. The journal housing as shown in Fig. 4 is resiliently supported in the truck frame 14 by means of a plurality of springs 25 interposed between the top of the journal housing and the bearing plate 26 which is on the frame proper. By this construction a light but rigid bearing which is relatively frictionless is provided. The housing for the bearing by reason of its "inside" disposition between the wheels is adapted to serve as a support for the braking mechanism, to which end it is accordingly provided with a vertical bracket plate 27, arranged to support the braking mechanism in operative relation with the brake drum. As shown more clearly in Figs. 2 and 3 the bracket plate 27 has at each end a conical projection 28. The projection shown at the left hand end in Fig. 3 carries a pair of oppositely extending supporting members in the form of screw-threaded bolts 29 and the projection at the other end serves as a pivotal mounting for the brake-shoe actuating lever 30.

The brake shoes, comprising a pair of arcuate segments 31, have a friction lining 32, as indicated more clearly in Fig. 4, adapted to engage frictionally with the surface of the brake drum. To this end the brake shoes 31 are provided at one end with lugs 33 which are pivoted to the screw-threaded blocks 34 disposed in adjustable relation on the bolts 29. At their other ends, the brake shoes have lugs 35, which are pivotally connected by means of links 36 to the short arms 37 of the brake-shoe actuating lever 30. It is accordingly seen that the brake shoes thus arranged comprise a friction means substantially encircling the brake drum which has for its actuating means the short lever arms 37 that move in fixed relation to each other when the braking mechanism is actuated; the mechanism as a whole being carried by the journal housings of the car wheels and moving with them so as to be independent of any movement or position of the truck frame with respect to the track.

Figure 5:
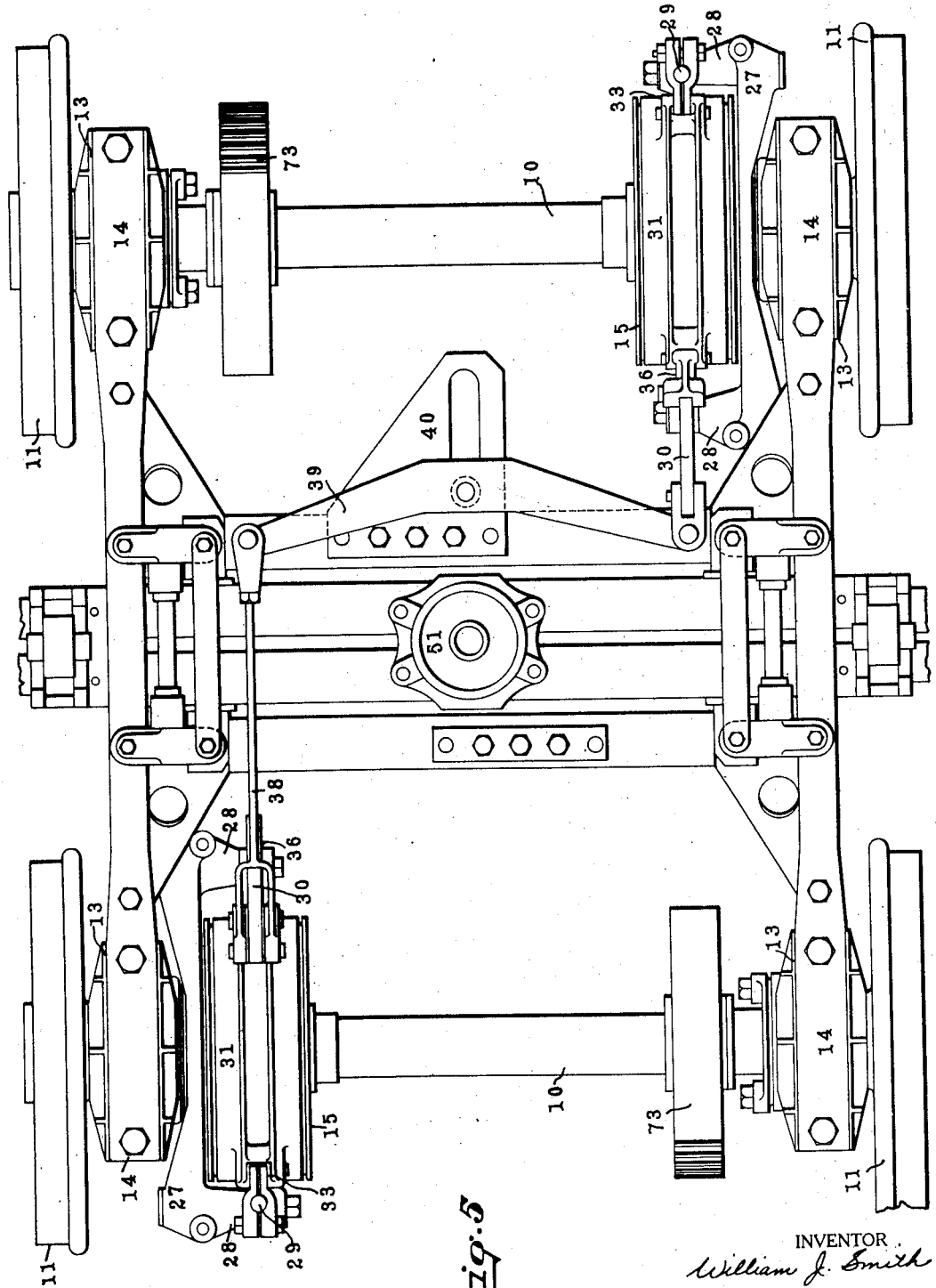
Fig. 5 is a top plan view of a complete truck constructed in accordance with this invention.

A brake rod 38 is shown in Fig. 5 for moving the brake-shoe actuating lever 30, the rod being connected to the equalizing lever 39, which is slidingly pivoted in the bracket 40 secured to a suitable transverse portion of the frame 14.

Figure 6:
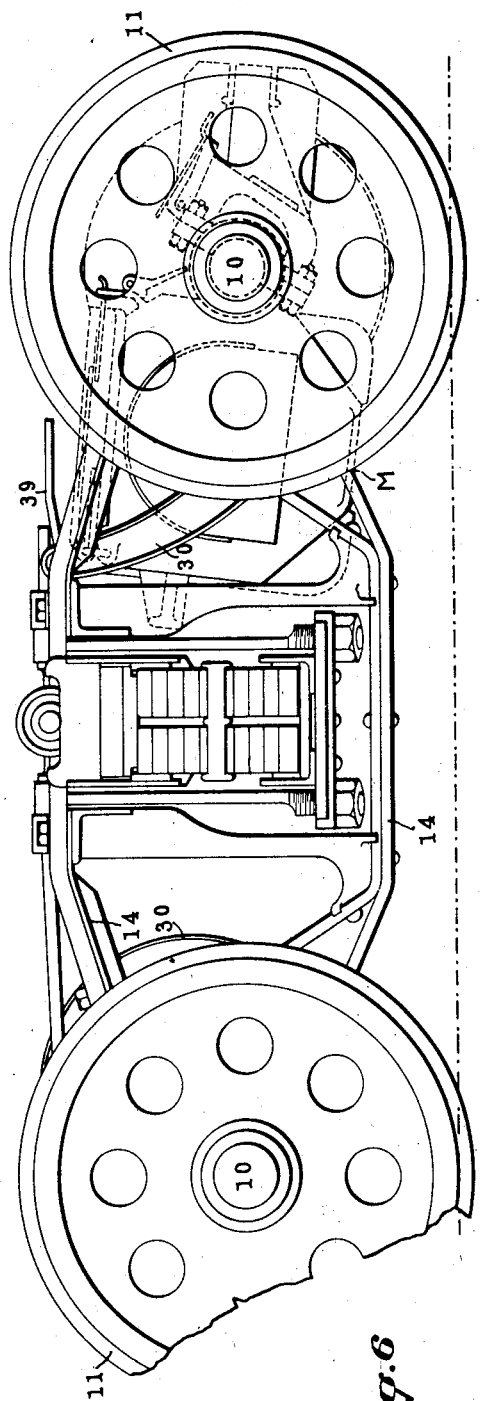
Fig. 6 is a side elevation of the truck shown in Fig. 5.

When in operation the railway car truck of this invention is equipped with electric motors suspended from the axles in the usual manner; such a motor is indicated at M in Fig. 6, the axles being shown as having the usual driving gears 73 mounted thereon so that they may be driven by the motors. The improved bearing construction here employed enables the car truck to be built in a light but rugged fashion and to carry relatively heavy loads with substantially a minimum of friction; the journal housings themselves have sufficient strength to support the brake mechanism independently of the truck frame. It is thus seen that this arrangement of the brake-actuating mechanism insures an even and efficient application of the brake shoes to the brake drum, wholly independent of any position of the car truck on tangents, curves or other portions of the track.

An improved brake drum mechanism for car trucks is shown in U. S. Letters Patent 1,526,764 issued in my name on February 17, 1925. From certain aspects of this invention, the arrangement here shown may be deemed a further improvement, particularly as regards the manner of mounting the brake-shoes upon the truck frame.

Since certain changes may be made in the above construction and different embodiments of the invention could be made without departing from the scope thereof, it is intended that all matter contained in the above description or shown in the accompanying drawing shall be interpreted as illustrative and not in a limiting sense.

Having described my invention, what I claim as new and desire to secure by Letters Patent, is:

1. In combination, a truck presenting side members, journal housings secured thereto, a pair of rotatable axles arranged one in advance of the other and extending through said housings, wheels secured to said axles at points beyond said side members, brake drums attached to said axles between said housings, a pair of brake shoes for each of said drums and positioned adjacent thereto, actuating means for each pair of shoes, means connecting said actuating means, supporting means fixedly secured to certain of said housings and adjacent said drums, screw-threaded members secured to said supporting means, means for adjustably connecting the inner ends of the brake shoes to said members, said actuating means being secured to the outer ends thereof and said supporting means pivotally mounting said actuating means.

2. In combination, a rotatable axle, a drum secured thereto, a bearing housing for said axle, a pair of brake shoes adjacent said drum, actuating means for moving said shoes into contact with said drum, a fixed plate forming a part of said housing and arranged adjacent said drum, a pair of screw-threaded members secured to said plate, means for adjustably connecting the inner ends of the shoes with said members, means for pivotally mounting the actuating member upon said plate, and arms forming a part of said actuating member and connected with the outer ends of said shoes.

In testimony whereof I affix my signature.

WILLIAM JUDSON SMITH.